United States Patent [19]

Junge et al.

[11] Patent Number: 4,803,830
[45] Date of Patent: Feb. 14, 1989

[54] SUPPORT ARRANGEMENT FOR COTTON HARVESTER ROW UNITS

[75] Inventors: Steve A. Junge, Johnston; Timothy A. Deutsch, Newton, both of Iowa

[73] Assignee: Deere & Company, Moline, Ill.

[21] Appl. No.: 87,073

[22] Filed: Aug. 19, 1987

[51] Int. Cl.$^4$ .............................................. A01D 46/08
[52] U.S. Cl. ........................................ 56/28; 56/15.5; 56/13.5
[58] Field of Search ................... 56/13.5, 15.5, 28, 40, 56/41, 44; 172/673, 667, 649, 645, 695; 111/69, 52, 85

[56] References Cited

U.S. PATENT DOCUMENTS

| | | |
|---|---|---|
| 2,672,001 | 3/1954 | Bopf et al. ............................ 56/15.5 |
| 3,785,130 | 1/1974 | Gaeddert ............................. 56/15.5 |
| 3,945,177 | 3/1976 | Scott et al. ........................... 56/13.5 |
| 4,249,365 | 2/1981 | Hubbard et al. ........................ 56/28 |
| 4,470,244 | 9/1984 | Leigers ............................... 56/15.5 |
| 4,722,173 | 2/1988 | Covington ............................ 56/28 |

OTHER PUBLICATIONS

9940 Cotton Picker (Serial No. 737-) Operator's Manual, OM-N200033 Issue D4, Preparing Picker, pp. 21–25.

Case-IH Cotton Picker Operator's Manual, pp. 82-83 and 194-195.
Case-IH Manual Rac 8-3050, pp. 9-300 through 9-305.

Primary Examiner—John Weiss

[57] ABSTRACT

Row unit support structure for a cotton harvester facilitating easy transverse adjustment of the row units on a support frame for servicing the units and/or changing the location of the units for differing row widths. The support frame includes a horizontal rail supported in generally cantilever fashion from the lift structure on the harvester, and individual row units are suspended for independent transverse adjustment on the rail by a roller assembly connected generally over the center of gravity of each unit. An additional roller attached at the upper rear of the unit runs on a second rail rearwardly and below the first rail to stabilize the unit. Removable pins lock each unit in position along the support frame. To adjust for different row widths or to move the units laterally for inspection or maintenance, the pins are removed and the units are rolled along the frame. The structure accommodates numerous combinations of row widths, including both narrow and more conventional widely spaced rows, and row capacities up to five rows while still providing good accessibility for inspection and servicing.

24 Claims, 5 Drawing Sheets

SUPPORT ARRANGEMENT FOR COTTON HARVESTER ROW UNITS

BACKGROUND OF THE INVENTION

The present invention relates generally to cotton harvesters and more specifically to a picking unit support arrangement for a cotton harvester.

On a typical cotton picker, each of the picking units is supported from the harvester main frame through a main attaching point toward the rear of a unit. A stabilizing member attaches either at the lower rear of the unit or at the top front of the unit. The attaching points are designed to allow minor lateral movement, usually no more than approximately three inches, for row width adjustment. To adjust for row width, bolts or pins must be removed and the units must be slid transversely on the support structure. Sliding the units is difficult and requires the use of a pry bar or a built-in adjusting mechanism. With some arrangements, the units must be shimmed to maintain levelness after adjusting for row width. As a result, the lateral adjustment of the row units is inconvenient and difficult and is usually avoided when possible. Heretofore, it has not been practical to move the individual row units transversely to provide added clearance for inspecting and servicing the row units. In any event, the lateral range of adjustment is usually inadequate to provide sufficient space for good access to the row units even if one were to adjust the units during servicing. This lack of space and adjustability of the units is particularly critical in narrow row cotton pickers adapted for harvesting cotton planted in rows spaced as narrowly as thirty inches. Present cotton pickers are not readily adaptable for converting between narrow row and wider row configurations

OBJECTS OF THE INVENTION

It is therefore an object of the present invention to provide an improved support arrangement for the row units of a cotton harvester. It is a further object to provide such an arrangement which facilitates lateral adjustment of the row units to accommodate different row spacings. It is a further object to provide such an arrangement which facilitates inspection and servicing of the units by permitting the units to be moved to open up space between the units.

It is another object of the present invention to provide an improved support arrangement for the row units of a cotton harvester which is relatively easy to manufacture and easily accommodates various combinations of row width and row capacities on the harvester. It is still a further object to provide such a structure which provides a greater range of lateral adjustment and movement of the individual row units than is typically available with the conventional cotton harvester. It is still another object to provide such a structure wherein the force necessary to move the row units laterally is significantly reduced over that of conventional harvesters.

It is yet another object of the present invention to provide an improved support arrangement for the row units of a cotton harvester which is relatively simple in construction and yet is stable and provides easy transverse adjustment of the individual row units. It is a further object to provide such an arrangement which can accommodate various combinations of row capacities and row widths, including narrow row as well as conventional wider row widths, while still providing good accessibility for servicing.

BRIEF DESCRIPTION OF THE INVENTION

A row unit support frame is connected by four-bar linkage structure to the main frame of the harvester. The support frame includes a horizontal rail, and the individual row units are supported on the rail for independent transverse adjustment by a roller assembly connected generally over the center of gravity of each unit. An additional roller, attached at the upper rear of the unit, runs on a second rail rearwardly and below the first rail and stabilizes the unit. Pins are used to lock each unit in position along the support frame. To adjust for different row widths or to move the units laterally for inspection and maintenance of a unit, the pins are removed and the units are rolled along the frame to new positions. The rollers attached above the center of gravity considerably reduce the effort required to laterally move the picking units and increase the range of lateral adjustment of the units significantly over previously available structures. Row width adjustment is more convenient and can be accomplished without need for pry bars or excessive effort. The convenient and easy lateral adjustment of the units also increases the serviceability of the units. Access to the units can be enhanced simply by rolling a unit and/or an adjacent unit laterally to open up more space between the units.

The support frame includes an upright lift arm bracket connected to the harvester lift structure. A horizontal connecting beam extends diagonally outwardly from the upper portion of the lift arm bracket to the forward portion of the frame adjacent the first horizontal rail. The attitude of the support frame is controlled by the four-bar linkage structure, and no shims are required for maintaining levelness after adjusting row width. The arrangement of the support frame with the stabilizing roller eliminates need for special stabilizers at the rear of each unit or at the top front of the unit. Each row unit is capable of being adjusted transversely substantially the length of the rail to facilitate mounting and removal of the row units.

Each row unit support frame is individually adjustable vertically for independent height control of the units supported thereon. The drives for the units on each row unit support frame are telescopingly connected together and are connected to a single main drive shaft which extends rearwardly from the support frame to the power unit on the harvester.

The structure also provides for various combinations of row widths and row capacities on a single machine. For example, two row unit support frames may be supported from the lift structure with each frame supporting either two or three row units so that up to four rows of cotton plants planted in a conventional wide row pattern (38 or 40 inch row widths) may be accommodated or up to five rows of narrowly spaced (30 inch widths) cotton may be harvested.

In another embodiment of the invention, a single row unit support frame is connected to the lift assembly on a conventional two-row harvester chassis and three narrow row units are adjustably mounted on the frame for harvesting three rows of cotton between the front drive wheels on the harvester. The drives on the three units are connected by telescoping shafts and are driven by a single main drive extending from the harvester to one of the row units.

These and other objects, features and advantages of the present invention will become apparent to those skilled in the art from the description which follows and from the drawings.

DESCRIPTION OF THE PREFERRED EMBODIMENT

Figure 1:
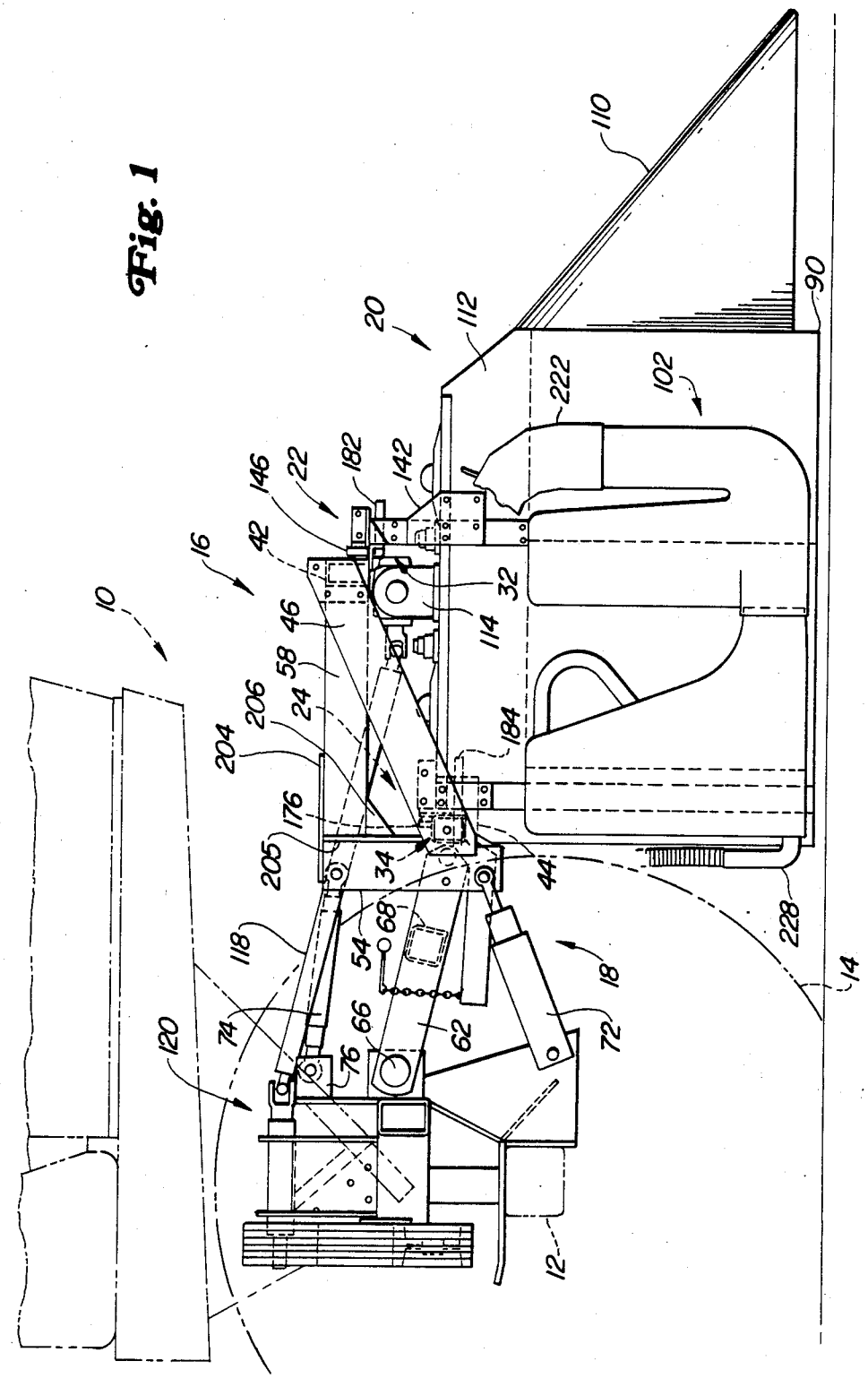
FIG. 1 is a side view of the front portion of a cotton harvester including the row unit support arrangement constructed in accordance with the teachings of the present invention.

Referring to FIG. 1, there is shown a cotton harvester 10 having a chassis or main frame indicated generally at 12 supported for forward movement over the ground by transversely spaced drive wheels 14. A row unit support frame 16 is connected by lift structure 18 to the main frame 12. A plurality of individual cotton harvesting row units 20 are connected by forward roller assemblies 22 and rear roller assemblies 24 to front and rear rail structures 32 and 34, respectively. The row units 20 may be rolled laterally on the rail structures 32 and 34 to adjust for various row widths and to open up space between the units to facilitate servicing of the units.

Figure 3:
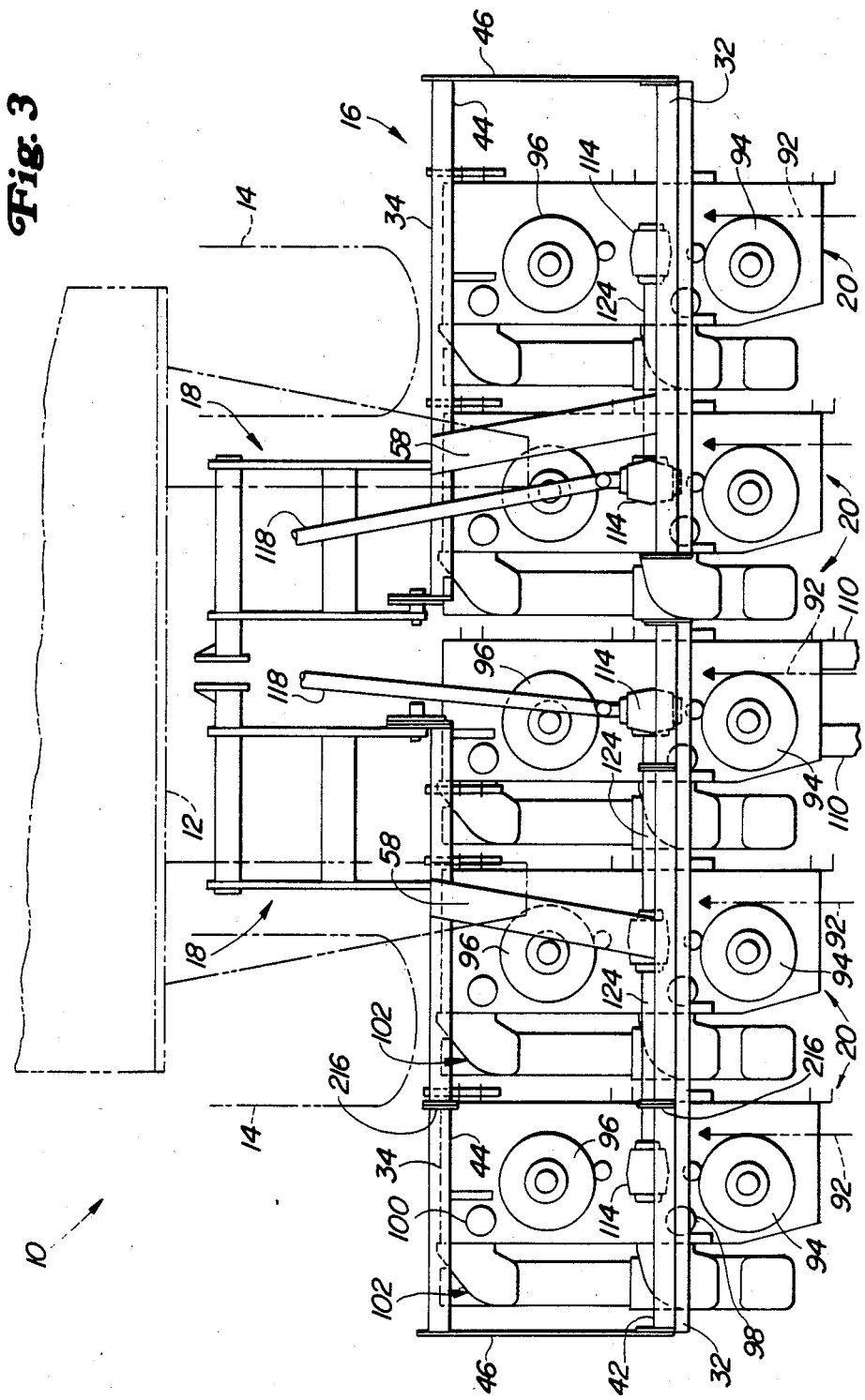
FIG. 3 is a top view of the front portion of a cotton harvester showing five row units arranged on two row unit support frames for picking five rows of narrowly spaced cotton.
Figure 4:
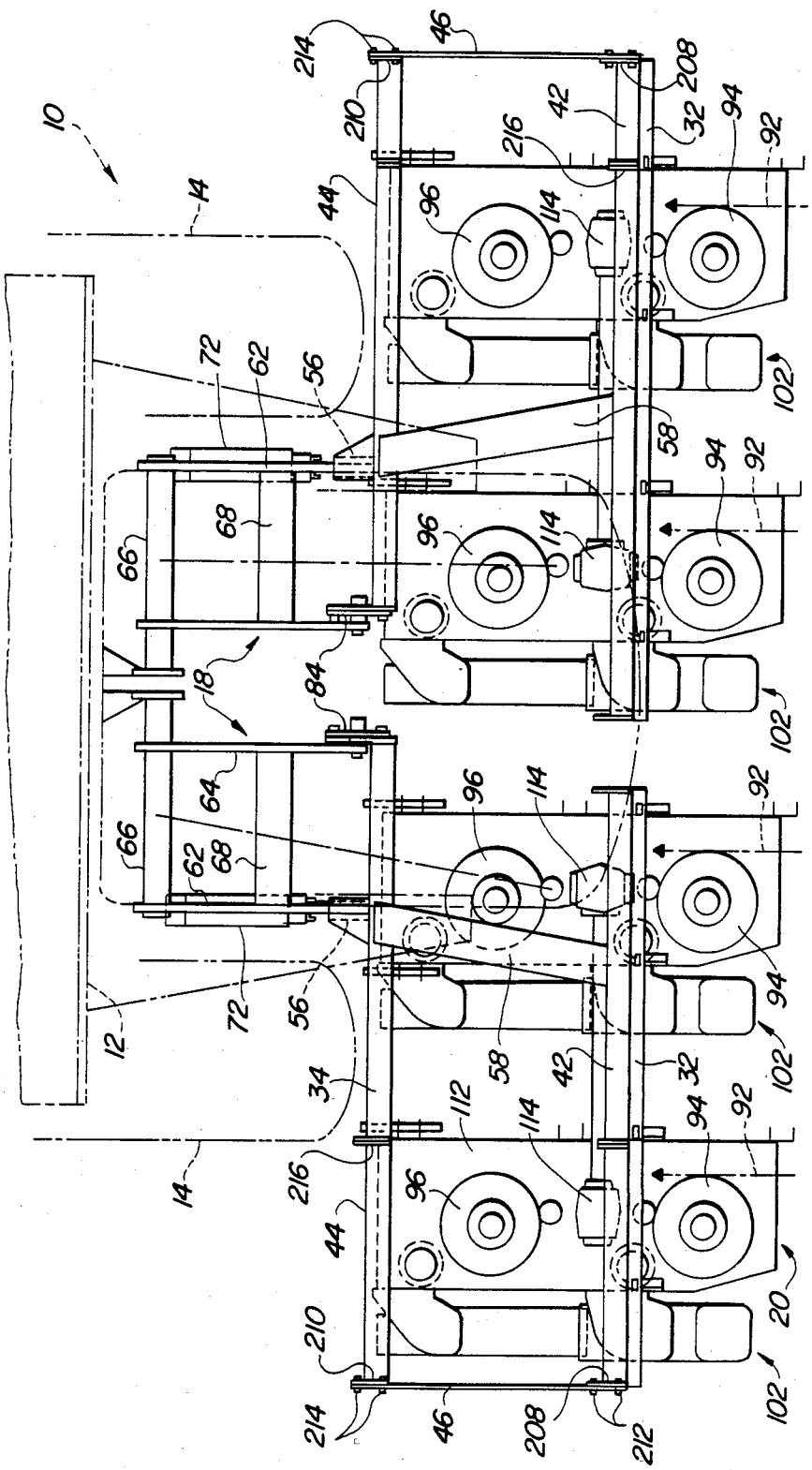
FIG. 4 is a view similar to FIG. 3 but showing a support arrangement carrying four units spaced for harvesting conventional widely spaced rows of cotton.
Figure 5:
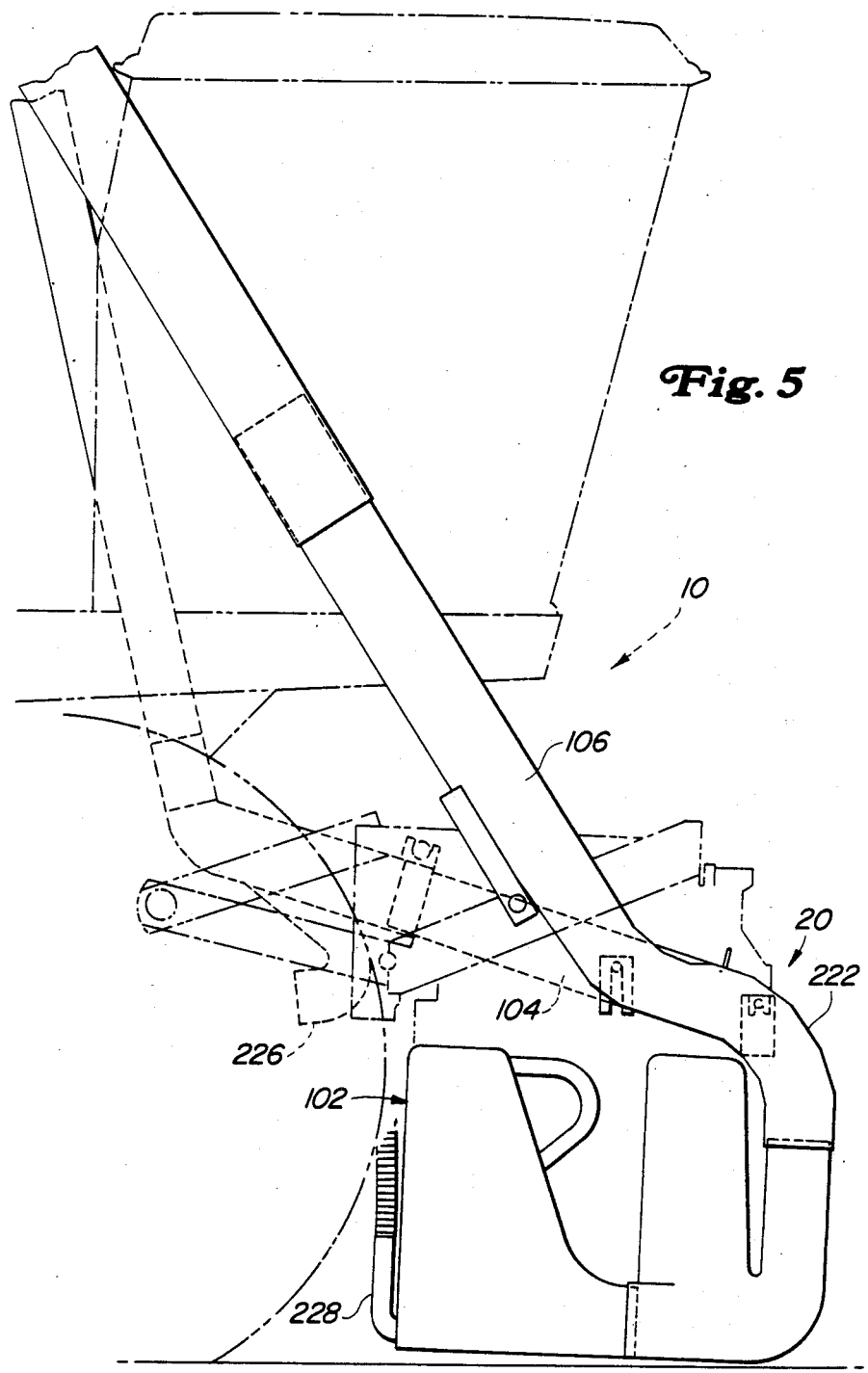
FIG. 5 is a side view of the harvester of FIG. 1 showing the support arrangement for the cotton conveying ducts.

As shown in FIGS. 3 and 4, a pair of lift structures 18 are utilized to support two individual row unit support frames 16 ahead of the respective drive wheels 14. The widths of the support frames 16 may be varied by adding or removing a support frame extension depending on the row widths and row capacities to be accommodated. Each support frame 16 includes forward and rear transverse horizontally extending beams 42 and 44, respectively. The forward beam 42 is supported above the rear beam 44 (FIG. 1) and is connected thereto by a removable upwardly and forwardly directed end connector 46 which is bolted to the outermost ends of the beams 42 and 44 and extends in the fore-and-aft direction therebetween. An upright lift arm bracket 54 is connected to the rear beam 44 and extends upwardly therefrom to an upper end 56 which is connected to the aft end of a main connecting beam 58. The beam 58 extends forwardly and slightly outwardly in substantially horizontal fashion from the end 56 to a connection with the forward transverse beam 42. As best seen in FIG. 1, the lift arm bracket 54 supports the main connecting beam 58 above the row units 20 in substantially cantilever fashion to facilitate unencumbered transverse movement of a unit on the support frame 16. The end connector 46 provides added strength and rigidity to the frame 16.

The lift structure 18 includes first and second transversely spaced lift arms 62 and 64 rigidly connected to and extending forwardly from a rockshaft 66 pivotally connected to the implement frame 12. The arms 62 and 64 are connected by a transverse beam 68 to constrain the arms for operation in unison. The forward end of the outermost lift arm 62 is pivotally connected to the lower end of the upright lift arm bracket 54. A hydraulic lift cylinder 72 has a cylinder end pivotally connected to the implement frame 12 and a rod end pivotally connected to the lower end of the upright lift arm bracket 54 below the pivotal connection of the bracket with the arm 62. A link 74 (FIG. 1) is pivotally connected to the main frame 12 by a bracket 76 located above the rockshaft 66. The forward end of the link 74 is pivotally connected to the upper end 56 of the lift arm bracket 54. The link 74 has an effective length approximately equal to but slightly less than that of the lift arm 62 to maintain the row unit support frame 16 and therefore the row units 20 in a generally level attitude during field operation as the lift cylinder 72 is actuated to raise and lower the row units. As the lift cylinders 72 are actuated to raise the support frames 16 to the transport position, the units 20 will tilt upwardly in the forward direction.

The forward end of the inner lift arm 64 of each of the lift structures 18 is pivotally connected to the innermost end of the corresponding rear beam 44 by bracket structure 84 fixed to the inner end of the beam 44. The lift arms 62 and 64 maintain the beams 42 and 44 in a generally horizontal attitude as the row unit support frame 16 is raised and lowered. The particular configuration of the lift arm bracket 54 and main connecting beam 58, located generally in line with the lift cylinder 72, provides a sturdy support for the forward beam 42 without interfering with the components on the row unit 20 during transverse movement of the unit. The link 74 as shown in FIG. 1 includes a turnbuckle for adjusting the attitude of the support frame 16. By extending the length of the link 74, the forward ends of the row units 20 may be tilted downwardly with respect to the aft ends of the unit, while decreasing the length of the link 74 will raise the forward ends of the units 20 relative to the aft ends.

In the preferred embodiment, the row units 20 are generally of the type shown and described in co-pending U.S. patent application Serial No. 935,460 of Timothy A. Deutsch and Arthur L. Hubbard, filed Nov. 26, 1986 and of common ownership with the present application. Each unit 20 includes a main row unit frame 90 defining a row-receiving area 92 and supporting a pair of upright picker drums 94 and 96 in a tandem arrangement on one side of the row-receiving area 92. Upright doffers 98 and 100 are located rearwardly and outwardly adjacent the respective drums 94 and 96 to doff cotton from the spindles on the drum and direct it toward narrow fore-and-aft extending door structure 102 located on the side of the unit 20. Cotton conveying duct structures 104 and 106 (FIG. 6) are connected to the forward ends of the door structures 102 and extend upwardly therefrom to the cotton basket on the harvester 10 for conveying cotton from the row units to the harvester. Stalk lifters 110 are provided at the forward end of the frame 90 to guide the row of cotton plants to the row-receiving area 92. The upper portion of the row unit frame 90 includes gear housing structure 112 supporting a drive arrangement (not shown) for providing drive to the picker drums and doffer mechanisms on the unit from a gearbox 114 attached to the top of the housing structure 112. The gearbox 114 on the innermost row unit 20 of each support frame 16 is connected to a main drive shaft 118 which extends rearwardly and upwardly from a gearbox 114 to a main drive unit 120 (FIG. 1) located between the drive wheels 14 on the harvester 10. The remaining gearbox or boxes 114 are connected to the driven gearbox by telescoping drive shafts 124.

Figure 2:
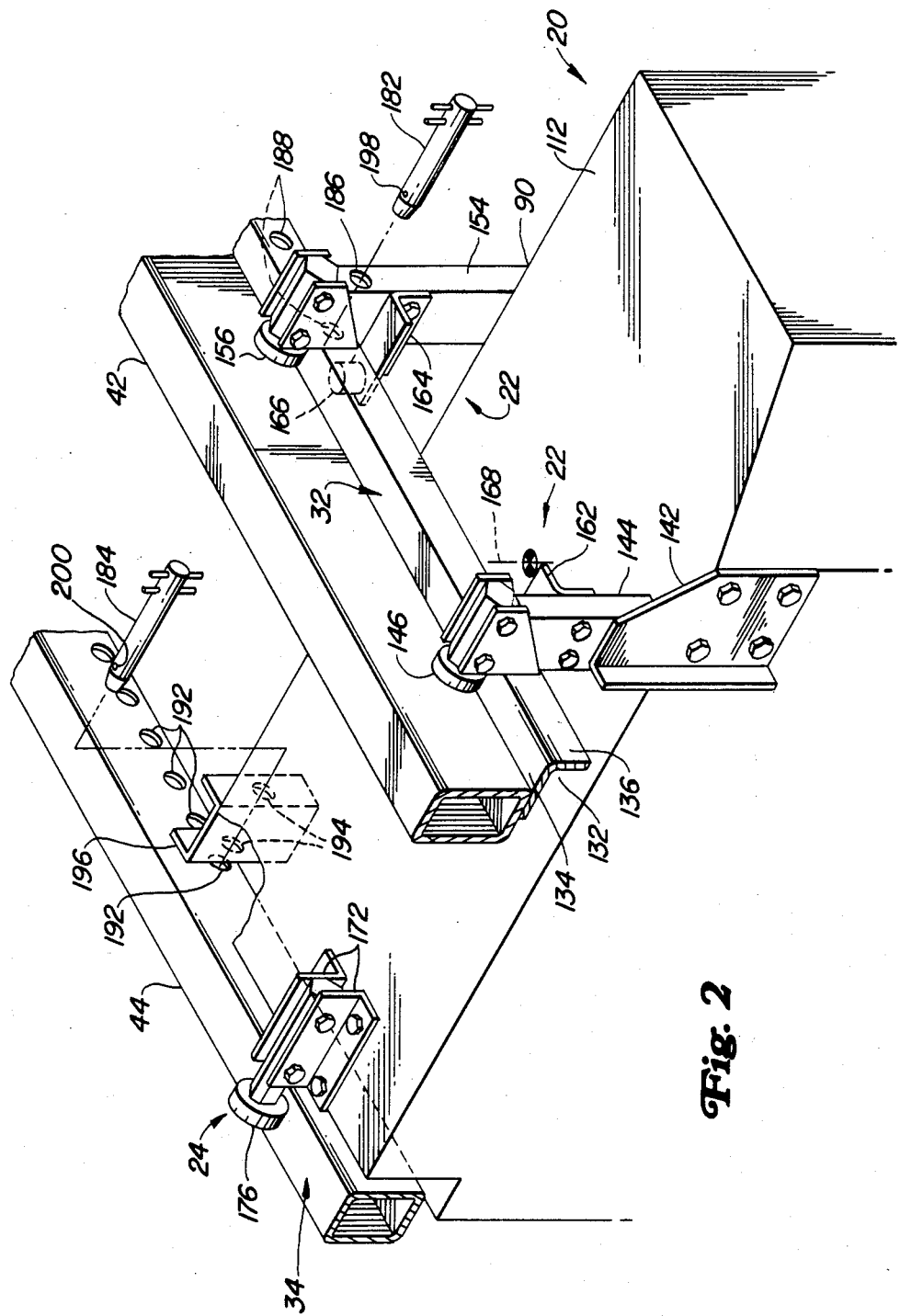
FIG. 2 is an enlarged perspective view of a portion of the support arrangement of FIG. 1 showing the roller assembly and locking pin detail.

As best seen in FIGS. 1 and 2, the forward rail structure 32 includes an angle 132 having a horizontal flange 134 welded to the bottom of the tubular beam 42 and an upright flange 136 which extends downwardly from the flange 134 at a location ahead of the forward face of the beam 42.

The front roller assemblies 22 include a first roller bracket 142 fixed to the side of the gear housing structure 112 adjacent the forward drum 94. The bracket 142 includes an upright beam 144 (FIG. 2) extending above the top of the gear housing structure 112 and supporting a rearwardly directed roller 146 for rotation about a fore-and-aft extending axis. An upright beam 154 is bolted to the opposite side of the gear housing structure 112 and supports a second roller 156 in transverse alignment with the first roller 156. The rollers 146 and 156 are supported on the rail 32 defined by the flange 134 of the angle 132. Angle brackets 162 and 164 are bolted to the insides of the upright beams 144 and 154, respectively, and extend rearwardly therefrom just under the lower edge of the upright flange 136. Rollers 166 are connected to the rear upper surface of the brackets 162 and 164 for rotation about vertical axes rearwardly adjacent the flange 136 to prevent forward movement of the row unit 20 on the forward rail structure 32. In the preferred embodiment, the center of gravity of the row unit 20, indicated generally at 168, is located approximately under but slightly rearwardly of the rollers 146 and 156 so that the weight of the unit 20 is carried primarily on the rollers 146 and 156 with a slight tendency for the rear of the unit 20 to rotate downwardly about the front roller assemblies 22. The center of gravity is also located generally between the rollers 146 and 156 in the transverse direction for a relatively even distribution of the weight on the rollers 146 and 156.

The rear roller assembly 24 (FIG. 2) includes a rear roller bracket 172 bolted to the top rear portion of the gear housing structure 112 between the sides of the structure. The bracket 172 supports a roller 176 for rotation about a fore-and-aft extending axis located below and between the axes of rollers 146 and 156. The roller 176 rests on the top surface of the transverse beam 44 which defines the rear rail structure 34. The rear roller assembly 24 stabilizes the unit 20. The aft end of the gear housing structure 112 extends under the beam 44 to prevent upward rotation of the aft end of the unit 20.

Pins 182 and 184 are utilized to lock the row unit 20 against lateral movement in one of a plurality of locations on the support frame 16. The upright beam 154 is apertured at 186 and the angle 132 includes a series of apertures 188 adapted for alignment in turn with the aperture 186 as the row unit 20 is moved laterally. A corresponding series of apertures 192 located in the beam 44 is adapted for alignment with apertures 194 in channel-shaped frame member 196. Once the pins 182 and 184 are inserted through the selected apertures (186, 188 and 194, 192), retaining pins (not shown) may be inserted through holes 198 and 200 to secure the pins in position.

The forward transverse beam 44 is supported substantially in cantilever fashion by the end connector 46 and the main connecting beam 58. Gussets 204, 205 and 206 are welded between the main beam 58 and the upright lift arm bracket 54 to strengthen the support for the forward beam 42 without interfering with the transverse adjustability of the row units 20. End plates 208 and 210 (FIG. 4) are welded to the outer ends of the beams 42 and 44, respectively, and the corresponding end connector 46 is connected to the plates 208 and 210 by bolts 212 and 214, respectively. To facilitate assembly of the row units 20 onto the row unit support frame 16, the end connector 46 is first removed and the row units are rolled onto the supporting frame 16. Thereafter, the end connector 46 is bolted to the beams 42 and 44 and prevents the outermost row unit when unpinned for lateral adjustment from rolling outwardly beyond the end of the beams 42 and 44. To provide different widths of row unit support frames 16 for differing row unit configurations, sections of the support frame 16 are fabricated with end plates such as shown at 216 of FIG. 4, and the sections are bolted together to provide the desired width. The end plates 216 are fabricated such that the connected sections provide a generally continuous forward and rear rail structure 32 and 34, respectively. This structure also permits the outer portions of the row unit support frames 16 to be removed to narrow the implement for transport.

The lower, forward end of the cotton conveying duct structure 104 and 106 advantageously extends under the beams 42 and includes lower duct structure 222 which is removably mounted at the forward end of the door structure 102. The upper portions of the duct structure 104 and 106 telescope to compensate for vertical movement of the row units 20. The door structures 102 are removable from the remainder of the row units 20 for access to the spindle and doffer areas. For further details of the door structure 102, reference may be had to copending U.S. patent application Ser. No. 087,075 of Timothy A. Deutsch and Virgil D. Haverdink, filed concurrently herewith and of common ownership with the present application. Air nozzles 226 located on the duct structure 104 and 106 are connected to a source of air on the harvester to induce an upward draft of air flow from the door structure 102. Additional nozzles 228 at the lower rear of the door structures 102 are also connected to the source of air and propel cotton forwardly over the floor of the door structure 102 toward the duct structure.

In operation, the row units are mounted on the row unit support frames 16 with the front and rear roller assemblies 22 and 24 received on the corresponding rail structure 32 and 34. The row units 20 are rolled inwardly to their desired locations, and if necessary the outer extensions are connected at 216 to the inner portions of the row unit support frames to provide the necessary width for the selected row unit width and row capacity. Once the units are properly located, the pins 182 and 184 (FIG. 2) are inserted through the corresponding holes 186, 188 and 194, 192 to secure the units 20 against lateral movement on the frame 16. To provide access to the units for inspection and servicing, the air duct structure 22 may be lifted from the door structure 102 and the door structure is pulled forwardly from between adjacent units. Thereafter the pins 182 and 184 are removed and the unit or units can be rolled as necessary on the rail structure 32 and 34 to open up the area between the units for easy access to the units.

The above-described structure provides numerous combinations of row unit configurations with a minimum number of additional parts. For example, as shown in FIG. 3, a five-row harvester for harvesting five narrowly spaced rows of cotton in one pass is provided with the drive wheels 14 straddling three rows of cotton and three innermost units harvesting those rows of cotton. A single additional row of cotton is harvested by a row unit 20 outwardly of each of the wheels 14. In FIG. 4, the row units are shown adjusted for harvesting four rows of cotton planted in a more conventional widely spaced configuration (38 to 40 inch rows). Two inner row units 20 harvest the cotton from two rows of plants which are straddled by the wheels 14, and two outermost units 20 harvest a row of cotton plants on either side of the wheels 14. In the configuration as shown in FIGS. 3 and 4, the left and the right row unit support frames 16 are individually adjusted vertically by the respective cylinders 72 operably connected to height sensing structure (not shown) associated with the row units on each of the support frames 16.

In another arrangement (not shown), the drive wheels 14 straddle three rows of narrowly spaced cotton, and three row units 20 supported on a single unit support frame 16 harvest the rows of cotton. The structure provides the ability to harvest cotton planted in narrowly spaced rows utilizing a conventional two-row harvester chassis while still providing access to the row units for inspection and servicing. In addition, with the configuration utilizing a single support frame 16, the units may be adjusted to harvest two rows of cotton planted in conventional widely spaced rows.

With the row units 20 suspended from the rail structure 32 with the center of gravity 168 located close to the rollers 146 and 156, and with the rollers 146 and 156 generally straddling the center of gravity, little effort is required to move the units 20 laterally as necessary for access to the units or for adjustment of the units for various row widths and row configurations. The rear roller 176 provides stability without need for additional stabilizing members and without the need of shimming or other adjustments to maintain levelness after adjustment for row width. The row unit support structure provides a single harvester 10 with the ability to harvest both narrow row and more conventional widely spaced row cotton with a minimum of additional components and with a minimum amount of conversion time.

Having described the preferred embodiment, it will be apparent that modifications can be made without departing from the scope of the invention as defined in the accompanying claims.

We claim:

1. In a cotton harvester including a fore-and-aft extending main frame supported for forward movement over a field having rows of cotton plants, and a fore-and-aft extending row unit having a center of gravity, said row unit including a plant passage for receiving a row of cotton plants and harvesting structure for removing cotton from the plants, row unit support structure comprising:

a transversely extending row unit support frame including a horizontal rail member;

lift structure connecting the support frame to the main frame;

means adjustably supporting the row unit from the support frame for lateral movement of the unit with respect to the support frame including roller means supported on the rail member and connected to the row unit generally above the center of gravity of the unit for selectively rolling the unit transversely on the support frame.

2. The invention as set forth in claim 1 wherein the support frame includes a second horizontal rail member offset in the fore-and-aft direction from the first-mentioned rail member, and stabilizer means mounted on the second rail member and connected to the row unit for movement therewith along the second rail member as the row unit is rolled along the support frame.

3. The invention as set forth in claim 1 wherein the lift structure includes an upright lift arm bracket, a generally horizontally extending main connecting beam extending forwardly from the upper portion of the upright lift arm bracket, a transverse beam connected to the main connecting beam in generally cantilever fashion, and wherein said rail member is connected to said transverse beam.

4. The invention as set forth in claim 3 wherein the row unit support frame includes a second transverse beam connected to the upright lift arm bracket rearwardly and below the first-mentioned transverse beam and extending outwardly therefrom to an outer end, said first-mentioned beam including an outer end aligned generally in the fore-and-aft direction with the outer end of the second beam, and end connector means removably mounted between the ends of the beams.

5. The invention as set forth in claim 1 wherein the roller means includes a pair of transversely spaced rollers located outwardly of the center of gravity of the row unit, wherein an upright transversely extending plane passing through the center of gravity intersects or lies closely adjacent to the rollers.

6. The invention as set forth in claim 5 wherein the plane passing through the center of gravity lies slightly rearwardly of the rollers to provide a tendency for the rear of the row unit to rotate downwardly, and wherein the support structure further includes a third roller located rearwardly of the first and second rollers and supported on the row unit support frame for stabilizing the row unit.

7. The invention as set forth in claim 6 wherein the rollers include generally fore-and-aft extending axes of rotation, and wherein the axis of rotation of the third roller is located below and generally between the axes of rotation of the first and second rollers.

8. The invention as set forth in claim 1 wherein the rail member includes an angle having a horizontal flange and a vertical flange, wherein said roller means includes a first roller connected to the row unit for rotation about a generally fore-and-aft extending axis wherein said roller is supported on the horizontal flange of the angle, a second roller, and means supporting the second roller for rotation about an upright axis adjacent the upright flange of the angle for preventing fore-and-aft movement of the row unit on the rail member.

9. The invention as set forth in claim 3 including a plurality of row units adjustably supported from the support frame, each row unit including a gearbox, each gearbox having an upper portion supported below the level of the main connecting beam for movement thereunder without interference from the main connecting beam, and means drivingly connecting the gearboxes together, said means drivingly connecting including means for permitting transverse adjustment of the row units relative to each other on the support frame.

10. The invention as set forth in claim 8 including pin means for selectively securing the row unit to the angle for preventing transverse movement of the row unit with respect to the support frame.

11. In a cotton harvester including a fore-and-aft extending main frame supported for forward movement over a field having rows of cotton plants, and a fore-and-aft extending row unit having a center of gravity, said row unit including a plant passage for receiving a row of cotton plants and harvesting structure for removing cotton from the plants, row unit support structure comprising:
   lift structure pivotally connected to the main frame for vertical movement with respect thereto;
   means for supporting a transversely extending beam forwardly of the lift structure for movement vertically therewith;
   means for suspending the row unit from the transverse beam including roller means connected to the row unit generally above the center of gravity for rolling the row unit transversely on the transverse beam; and
   means for maintaining a preselected attitude of the row unit with respect to the transverse beam including second roller means offset a substantial distance from the first roller means and connected between the row unit and lift structure.

12. In a cotton harvester including a fore-and-aft extending main frame supported for forward movement over a field having rows of cotton plants, and a fore-and-aft extending row unit having a center of gravity, said row unit including a plant passage for receiving a row of cotton plants and harvesting structure for removing cotton from the plants, row unit support structure comprising:
   lift structure pivotally connected to the main frame for vertical movement with respect thereto;
   means for supporting a transversely extending beam forwardly of the lift structure for movement vertically therewith;
   means for suspending the row unit from the transverse beam including roller means for rolling the row unit transversely on the transverse beam;
   means for maintaining a preselected attitude of the row unit with respect to the transverse beam; and
   a second transversely extending beam, means for connecting the second beam to the lift structure at a location offset in the fore-and-aft direction from the first beam, said second beam extending generally parallel to the first beam, and wherein the means for maintaining a preselected attitude includes second roller means supported by the second transverse beam and connected to the row unit.

13. The invention as set forth in claim 12 wherein the lift structure includes four bar linkage structure having an upright lift arm bracket, a main connecting beam extending forwardly from the upper portion of the lift arm bracket and supporting the first-mentioned transverse beam in generally cantilever fashion therefrom, and means connecting the second transverse beam to the lift arm bracket rearwardly and below the first transverse beam.

14. The invention as set forth in claim 13 wherein the second roller means is supported by the second transverse beam, and the first roller means is supported by the first transverse beam.

15. The invention as set forth in claim 14 including an angle connected to the first transverse beam and having a horizontal flange supporting the first roller means.

16. The invention as set forth in claim 15 wherein the angle includes an upright flange connected to the horizontal flange and wherein the roller means includes a first roller supported on the horizontal flange and a second roller having an axis of rotation generally perpendicular to the first roller and supported adjacent the upright flange for preventing the row unit from moving in the fore-and-aft direction with respect to the transverse beam.

17. In a cotton harvester including a fore-and-aft extending main frame supported for forward movement over a field having rows of cotton plants by a pair of transversely spaced drive wheels, and a plurality of fore-and-aft extending row units, each row unit having a center of gravity and including a plant passage for receiving a row of cotton plants and harvesting structure for removing cotton from the plants, row unit support structure comprising:
   an upright bracket connected for vertical movement to the forward end of the main frame;
   a main connecting beam extending forwardly from the upright bracket;
   a transverse beam supported generally in cantilever fashion from the forward end of the main connecting beam;
   means for suspending the row units in transversely spaced relationship from the transverse beam including means for moving the suspended units transversely along the beam to thereby facilitate conversion of the harvester between a wide row harvester and a narrow row harvester and to permit areas between the units to be opened up for servicing of the units.

18. The invention as set forth in claim 17 wherein the row units each include a gearbox defining the uppermost portion of the unit, said means for suspending the row units supporting said uppermost portion below the main connecting beam to thereby facilitate relatively unrestricted transverse adjustment of the units along a substantial portion of the transverse beam.

19. The invention as set forth in claim 17 wherein the means for suspending includes roller means connected to each of the units adjacent the respective center of gravity.

20. The invention as set forth in claim 17 including a second transverse beam supported from the main frame for vertical movement independently of and transversely adjacent the first-mentioned transverse beam, and at least one row unit suspended from the second transverse beam for vertical movement therewith.

21. The invention as set forth in claim 20 wherein two of the row units are suspended forwardly of and between the drive wheels from the first-mentioned transverse beam for harvesting two rows of cotton between the wheels and wherein said one row unit is suspended from the second transverse beam for harvesting a third row of cotton between the wheels, and wherein the outermost row unit of said two of the row units is selectively movable outwardly on the corresponding transverse beam for alternatively harvesting a row of cotton outwardly of the corresponding drive wheel.

22. The invention as set forth in claim 20 including two row units supported from the second transverse beam for harvesting a row of cotton on each side of one of the drive wheels, and three row units supported from the first-mentioned transverse beam for harvesting two rows of cotton on one side of the other of the drive wheels and one of cotton on the other side of said other of the drive wheels.

23. The invention as set forth in claim 17 wherein three row units are suspended from the transverse beam for harvesting three rows of cotton between the drive wheels.

24. The invention as set forth in claim 17 including fore-and-aft extending door structure located between adjacent row units and duct structure extending upwardly and rearwardly from the forward end of the door structure, said duct structure extending from the door structure under the transverse beam.

* * * * *